D. C. DAVIS.
MACHINE FOR TESTING THE HARDNESS OF MATERIALS.
APPLICATION FILED MAR. 4, 1918.
1,381,288. Patented June 14, 1921.
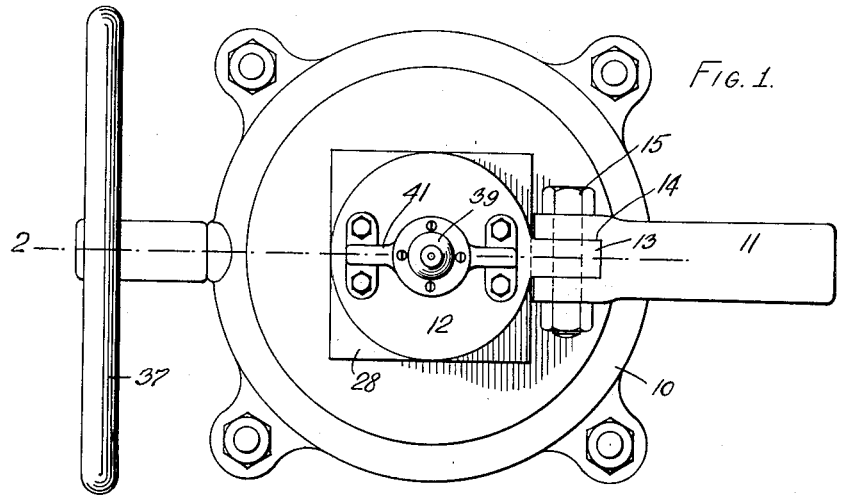
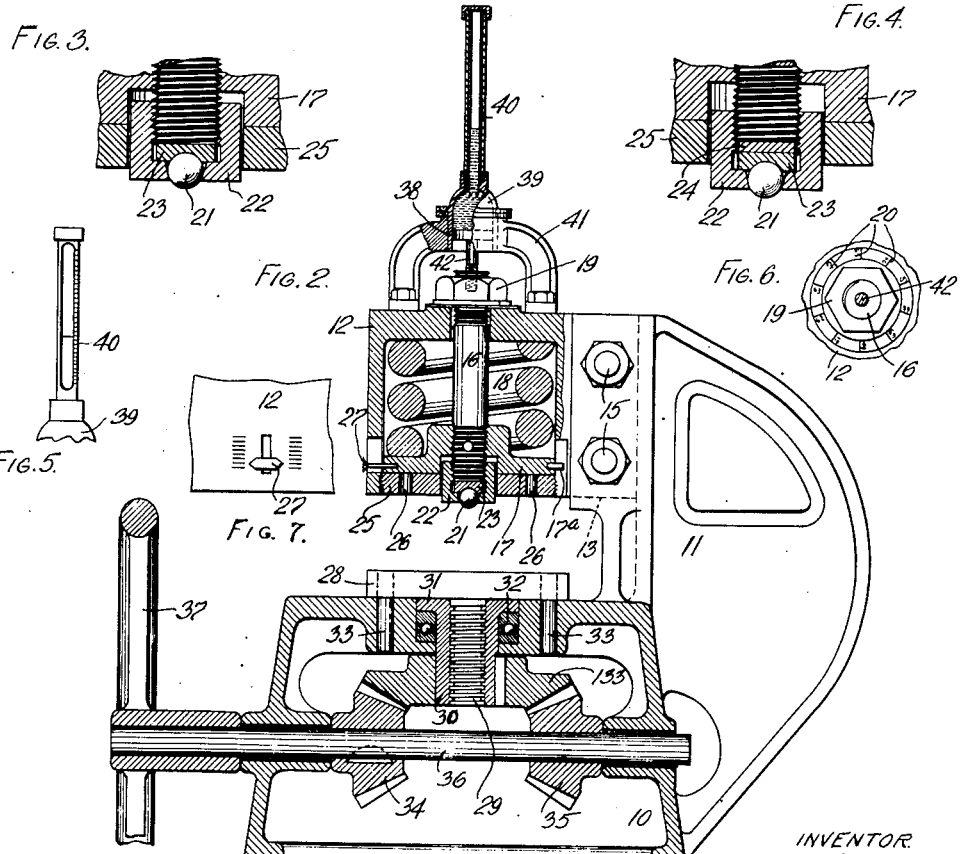
INVENTOR
Donald C. Davis,
By Wilhelm & Parker
ATTORNEYS.

UNITED STATES PATENT OFFICE.

DONALD C. DAVIS, OF BUFFALO, NEW YORK.

MACHINE FOR TESTING THE HARDNESS OF MATERIALS.

1,381,288.   Specification of Letters Patent.   Patented June 14, 1921.

Application filed March 4, 1918. Serial No. 220,166.

*To all whom it may concern:*

Be it known that I, DONALD C. DAVIS, a citizen of the United States, residing at Buffalo, in the county of Erie and State of New York, have invented a new and useful Improvement in Machines for Testing the Hardness of Materials, of which the following is a specification.

This invention relates to machines for testing the hardness of materials by the so-called "Brinell" method in which a hardened steel ball is pressed against the sample or piece of material being tested, the hardness of which is determined from the measurement of the indentation made by the ball in the sample under a predetermined pressure.

The objects of the invention are to provide a hardness testing machine which will insure accuracy and can be operated rapidly, and which is light and portable, adapting it to be carried to the work or from place to place; also to construct the machine so that it can be readily adapted and adjusted for testing samples of different sizes and shapes and of different degrees of hardness; also to make provision whereby the machine cannot be accidentally overloaded; also to make the measuring element entirely separate and independent of the pressure producing or power element so that the measuring element can be readily removed as a unit and replaced in the machine without affecting its adjustment, capacity or accuracy, and so that one measuring element suited for one class of work can be readily substituted for another measuring element suitable for a different class of work; also to construct the machine so that any wear which may occur in the power element will have no effect on the results indicated by the measuring element; also to provide simple and desirable means for holding the hardened ball which permits the same to be readily replaced; also to improve testing machines of this type in the other respects hereinafter described and set forth in the claims.

In the accompanying drawings:

Figure 1 is a plan view of a testing machine embodying the invention.

Fig. 2 is an elevation thereof, partly in section on line 2—2, Fig. 1.

Fig. 3 is an enlarged section showing the holder for the hardened ball.

Fig. 4 is a similar view, showing the ball adjusted to a different position for an increased capacity.

Fig. 5 is an elevation of the measurement indicator.

Fig. 6 is a sectional plan view of the plunger adjusting means.

Fig. 7 is a fragmentary side elevation of the measuring element.

The machine comprises a suitable stationary frame, a measuring element mounted on this frame and embodying a movable plunger or part carrying the testing ball, and a spring acting on the plunger to press the ball yieldingly against the sample, a platen or support for the sample arranged opposite the measuring element, and suitable mechanism for moving the platen to press the sample against the ball. When the ball plunger is moved by forcing the sample against the ball, the spring opposes the movement of the plunger and ball and a predetermined movement of the plunger will cause a compression of the spring sufficient to give the pressure required for the test.

The machine is preferably constructed as follows:

The stationary frame of the machine comprises a base portion 10 on which the platen or sample support and the operating mechanism therefor are mounted, and a standard or portion 11 which projects upwardly from the base portion and on which the measuring element is mounted. This frame may be of any suitable form and construction having the necessary strength and rigidity. Removably, but stationarily mounted on the standard 11 and overhanging the base 10, is a casing or cylinder 12 which contains the parts of the measuring mechanism. This casing 12, as shown, is provided at one side with a lug or tongue 13 which enters a correspondingly shaped groove 14 in the standard, and is rigidly secured therein by bolts 15. By removing these bolts the casing 12 with the parts of the measuring element carried thereby can be removed as a unit and replaced. This enables the measuring element to be removed and put in a safe when the machine is not in use to prevent its being tampered with or its adjustment disturbed, and also makes it possible to readily substitute for one measuring element another one of a different capacity without disturbing or in any wise affecting the operating parts of the measuring element.

16 represents a plunger arranged centrally in the casing 12 to move lengthwise therein. Secured to the plunger 16 within the casing 12 is a plate 17 between which and the upper end of the casing is arranged a strong coil spring 18 which is adapted to be compressed by the upward movement of the plunger. The plate 17 is preferably screwed on the lower screwthreaded end of the plunger and is pinned thereon to prevent it from unscrewing. A pin or projection 17$^a$ on the plunger plate entering a guide groove in the casing prevents the plunger from turning in the casing. The upper end of the plunger 16 preferably projects out through a central hole in the head of the casing 12 and is screwthreaded for the reception of an adjusting nut 19 which is adapted to bear against the head of the casing 12 or on an interposed washer. By turning this nut, the spring 18 can be placed under the initial compression necessary to give the capacity desired. The pressure for which the machine is set is preferably indicated by an index mark on the nut coöperating with pressure indications 20 on the head of the casing or other suitable part. 21 indicates the testing ball. This ball is secured at the lower end of the plunger 16, preferably by a retaining cap 22 which is screwed on the threaded lower end of the plunger 16 and is provided in its bottom with an opening in which the ball is confined and through which the ball projects for engagement with the sample to be tested. The ball bears at its inner or upper side against a hardened disk 23 which is arranged in the cap 22 between the ball and the lower end of the plunger and is provided in its underside with a depressed seat for the ball. This seat is preferably formed by pressing the ball into the disk before hardening the latter, so that the ball will accurately fit the seat. This construction enables the ball to be readily secured on the plunger and replaced in case of injury to the ball.

24, Fig. 4, represents a shim plate which may be inserted between the seat disk 23 and the end of the plunger for adjusting the ball relatively to the end of the plunger and thereby changing the capacity of the machine as hereinafter explained. Shim plates of different thicknesses, or one or more shim plates may be used as may be necessary to give the desired adjustment of the ball relative to the plunger.

25 represents a bottom or a stop plate which is secured to the lower end of the casing 12 and against which the sample being tested is adapted to strike to limit the movement of the plunger 16 and the compression of the spring in the operation of the machine. This stop plate 25 is preferably screwthreaded and screwed into the threaded lower end of the casing 12. Holes 26 are shown in the stop plate for the engagement of a suitable tool for screwing the plate into and out of the casing. 27 represents a pointer secured to the plunger, extending through a slot in the casing 12 and coöperates with graduations on the exterior of the casing for indicating the extent of movement of the plunger when testing a sample. 28 represents the platen or sample support. This preferably consists of a plate arranged above the base 10 of the frame opposite the measuring element and provided with a screw 29 which works in the screwthreaded hole of a nut or sleeve 30 which is mounted to rotate in the base 10 of the frame. As shown, this screw sleeve 30 is provided at its upper end with a flange 31 which bears against a ball bearing 32 in a cavity in the top of the base 10 of the frame. The platen is provided with one or more guide pins 33 which depend therefrom into and are adapted to slide in guide holes in the top of the base 10 of the frame, so as to prevent the rotation of the platen. The platen is raised and lowered toward and from the measuring element by turning the screw sleeve 30. Any suitable mechanism for turning the sleeve for this purpose may be employed. As shown, a bevel gear wheel 133 is keyed to the lower end of the screw sleeve and meshes at diametrically opposite sides thereof with two bevel gears 34 and 35 on a horizontal shaft 36 which is journaled in suitable bearings in the base 10 of the frame and is provided at one end with a hand wheel 37 for turning the shaft. One of the bevel gears 34, 35 is keyed on the shaft 36 while the other is loose thereon and is used to equalize the pressure on the platen. By turning the shaft 36, the platen is raised to force the sample resting on the platen against the testing ball. Any other suitable hand or power-operated mechanism for moving the platen toward and from the measuring element can be employed.

As the upward movement of the ball is resisted by the spring 18, a definite pressure is required to compress the spring and move the ball upwardly until the upward movement is arrested by the engagement of the sample with the stop plate 25. The pressure causes the ball to make a greater or less depression in the sample, depending upon the hardness thereof. Since the upward movement of the plunger and the compression of the spring are limited by the engagement of the sample with the stop plate 25, the machine can be operated rapidly and the pressure on the testing ball will always be the same for a given adjustment of the measuring element, and this is not affected by any wear or lost motion in the power element. The machine can be readily set for different pressures or to suit different kinds of materials by suitably adjusting the nut 19 or by inserting or removing one or more appropriate shim plates 24 between the ball seat-disk and the end of the plunger to cause the ball to project a greater or less distance from the stop plate 25. The extent of movement of the plunger when testing a sample is indicated by the pointer 27 which thus enables the operator to readily ascertain whether the movement of the plunger necessary for a given pressure takes place.

Any suitable indicator can be used for showing the depth or diameter of the depression made by the testing ball in the sample, and thereby indicating the hardness of the sample. The indicator shown in the drawings for this purpose consists of a piston 38 connected to the upper end of the plunger 16 and working in a cylinder 39 provided with a graduated glass tube extension 40 and containing mercury or some other suitable liquid. When the plunger 16 is raised the piston will move upwardly in the cylinder and displace the liquid, causing it to rise more or less in the graduated tube, depending upon the depth of the depression made in the sample. The tube can be calibrated to show either the depth or diameter of the depression, or both, as may be desired. The bore of the tube 40 is small so that a very small movement of the piston will produce a great extension of the mercury column which will thus readily show small differences in the depressions in the samples.

The cylinder 39 is stationarily mounted above the casing 12 by a yoke 41 or other suitable support. The piston 38 is shown as connected to the plunger 16 by a threaded rod 42 which is screwed into a threaded hole in the end of the plunger. The piston can therefore be adjusted up or down in the cylinder as may be necessary, to insure the correct reading of the indicator, and the indicator can be readily adjusted from time to time.

I claim as my invention:

1. In a hardness testing machine, the combination of a rigid frame, a measuring element mounted on said frame and comprising a movable testing member, a spring member for resisting movement of said testing member, and a support for said members, a movable platen, and mechanism mounted on said frame independently of said measuring element support for moving said platen to press a sample against said testing member and straining said spring, said measuring element being stationarily but detachably mounted on the frame and removable as a unit therefrom.

2. In a hardness testing machine, the combination of a rigid frame, a measuring element mounted on said frame and comprising a movable testing member, a spring member for resisting movement of said testing member, and a support for said members, a movable platen, mechanism mounted on said frame independently of said measuring element support for moving said platen to press a sample against said testing member and straining said spring, and means carried by said measuring element for regulating the resistance of said spring member, said measuring element being stationarily but detachably mounted on the frame and removable as a unit therefrom.

3. In a hardness testing machine, the combination of a rigid frame, a measuring element mounted on said frame and comprising a movable testing member, a spring member for resisting movement of said testing member, and a support for said members, a movable platen, mechanism mounted on said frame independently of said measuring element support for moving said platen to press a sample against said testing member and straining said spring, and an adjustable stop which the sample engages to limit the movement of said testing member by said platen.

4. In a hardness testing machine, the combination of a rigid frame, a measuring element comprising a casing secured in a fixed position on said frame, a plunger movable in said casing and carrying a testing member, and a spring in said casing for resisting movement of said plunger, a movable platen, mechanism mounted on said frame independently of said casing for moving said platen to press a sample against said testing member and move said plunger against the resistance of said spring, means for predetermining the movement of the sample, and means for indicating the depression made in the sample.

5. In a hardness testing machine, the combination of a rigid frame, a measuring element comprising a casing secured to said frame, a plunger movable in said casing and carrying a testing member, and a spring in said casing for resisting movement of said plunger, a movable platen, and mechanism mounted on said frame independently of said casing for moving said platen to press a sample against said testing member and move said plunger against the resistance of said spring, said casing being detachably secured on the frame and removable with the parts carried thereby as a unit from the frame.

6. In a hardness testing machine, the combination of a rigid frame, a measuring element comprising a casing secured in fixed position on said frame, a plunger movable in said casing and carrying a testing member, and a spring in said casing for resisting movement of said plunger, a movable platen, mechanism mounted on said frame independently of said casing for moving said platen to press a sample against said testing member and move said plunger against the resistance of said spring, and means carried by said measuring element for regulating the resistance of said spring, said casing being detachably secured on the frame and removable with the parts carried thereby as a unit from the frame.

7. In a hardness testing machine, the combination of a rigid frame, a measuring element comprising a casing secured to said frame, a plunger movable in said casing and carrying a testing ball, and a spring in said casing for resisting movement of said plunger, a movable platen, mechanism mounted on said frame independently of said casing for moving said platen to press a sample against said ball and move said plunger against the resistance of said spring, and means for securing said ball in different positions relative to said plunger.

8. In a hardness testing machine, the combination of a rigid frame, a measuring element comprising a casing secured to said frame, a plunger movable in said casing and carrying a testing ball, and a spring in said casing for resisting movement of said plunger, a movable platen, mechanism mounted on said frame independently of said casing for moving said platen to press a sample against said ball and move said plunger against the resistance of said spring, means for regulating the resistance of said spring, and means for securing said ball in different positions relative to said plunger.

9. In a hardness testing machine, the combination of a rigid frame, a measuring element mounted on said frame and comprising a movable testing member, a spring member for resisting movement of said testing member, and a support for said members, a movable platen, mechanism mounted on said frame independently of said measuring element support for moving said platen to press a sample against said testing member and straining said spring, means for predetermining the movement of the sample and a measuring device carried by said measuring element for indicating the depression made in the sample by said testing member.

10. In a hardness testing machine, the combination of a rigid frame, a measuring element mounted on said frame and comprising a movable testing member, a spring member for resisting movement of said testing member, and a support for said members, a movable platen, mechanism mounted on said frame independently of said measuring element support for moving said platen to press a sample against said testing member and straining said spring, means for predeterming the movement of the sample and a measuring device carried by said measuring element for indicating the depression made in the sample by said testing member, said measuring device including a movable member adjustable relative to said testing member.

11. In a hardness testing machine, the combination of a rigid frame, a measuring element mounted on said frame and comprising a movable testing member, a spring member for resisting movement of said testing member, and a support for said members, a movable platen, mechanism mounted on said frame independently of said measuring element support for moving said platen to press a sample against said testing member and straining said spring, means for predetermining the movement of the sample, a measuring device carried by said measuring element for indicating the depression made in the sample by said testing member, and an additional indicator for showing the extent of movement of said testing member.

12. In a hardness testing machine, the combination of a rigid frame, a measuring element comprising a casing secured to said frame, a plunger movable in said casing and carrying a testing member, and a spring in said casing for resisting movement of said plunger, a movable platen, mechanism mounted on said frame independently of said casing for moving said platen to press a sample against said testing member and move said plunger against the resistance of said spring, and an adjustable stop at the end of said casing which the sample engages to limit the movement of said plunger by said platen.

Witness my hand this 28th day of February.

DONALD C. DAVIS.

Witnesses:
ALLEN B. BRIMMER,
GEORGE E. HAMMOND.